(12) United States Patent
Truesdell

(10) Patent No.: US 6,571,646 B1
(45) Date of Patent: Jun. 3, 2003

(54) METERED TORQUE ADJUSTMENT WRENCH

(76) Inventor: Thomas Bruce Truesdell, 33 Oakmont Dr., Rancho Mirage, CA (US) 92270

( * ) Notice: Subject to any disclaimer, the term of this patent is extended or adjusted under 35 U.S.C. 154(b) by 0 days.

(21) Appl. No.: 10/190,824

(22) Filed: Jul. 5, 2002

(51) Int. Cl.$^7$ .............................. G01N 25/56; G01N 5/02
(52) U.S. Cl. ................................................. 73/862.21
(58) Field of Search ........................ 73/862.21, 862.22, 73/862.23, 862.24, 862.25

(56) References Cited

U.S. PATENT DOCUMENTS

| | | | | |
|---|---|---|---|---|
| 4,091,664 A | * | 5/1978 | Zerver ...................... | 73/862.21 |
| 4,265,108 A | * | 5/1981 | Wallace et al. ........... | 73/862.21 |
| 4,290,329 A | * | 9/1981 | Green ....................... | 81/477 |
| 4,805,464 A | * | 2/1989 | Grabovac ................. | 73/862.26 |
| 4,827,813 A | * | 5/1989 | Ruland ..................... | 81/477 |

* cited by examiner

Primary Examiner—Max Noori
(74) Attorney, Agent, or Firm—Robert Samuel Smith

(57) ABSTRACT

A metered torque wrench for applying a measured torque to a shaft including an elongated housing enclosing a spring being a stack of resilient metal strips. One end of the stack is secured to one end of the housing. The other end of the stack is secured to a coupler journalled into another end of the housing. A dial plate has a scale and is mounted on the coupler adjacent the another end of the housing. When torque is applied by turning the housing with coupler mounted on the shaft, the magnitude of torque is indicated by displacement of a marker on the edge of the housing relatie to the origin of the dial scale. A floating ring retains the torque reading after the torque has been removed.

11 Claims, 2 Drawing Sheets

METERED TORQUE ADJUSTMENT WRENCH

FIELD OF THE INVENTION

This invention relates to devices for applying torque very accurately and for aiding in limiting the torque applied to a shaft such as the shaft of a tap, bolts, etc. The limit is typically set at a value above which, the shaft can be expected to break. The invention is particularly related to tapping operations involving very small taps, 2-56 (threads per inch) and finer

BACKGROUND AND INFORMATION DISCLOSURE

Cutting threads in holes in manufacturing operations can be a critical operation. Tap breakage occurs occasionally because the operation requires applying a relatively large torque to a tap that must have a cross section that is limited by the size of hole being tapped. Tapping a number of holes larger than for a 2-56 thread is routinely performed in CNC operations where the tap is inserted into the "slip"chuck of a tapping head mounted on a mill. A number of disclosures have appeared which adopt this approach.

For example, U.S. Pat. No. 5,174,424, to Eriksson is for a tapping head of the type having a clutch between the driver and the driven members of the machine which is adjustable to prevent application of excessive torque as described above.

U. S. Pat. No. 5,076,740 to Petrie discloses an axially telescopic tapper including a fixed part adapted to be held in a machine spindle and a movable part having limited axial displacement.

U. S. Pat. No. 4,820,087 to Ikemoto is for a tap drive unit to be installed in a mill spindle and includes a drive member attached to the main spindle of a mill and a guide member with a tap holder screwed into one end and clutching connection to the driver at the other end.

All of these approaches require that the operator operate the mill to position the tap accurately in line with the hole and this is a time consuming procedure. Furthermore, the disclosed chucks are characterized by complex construction that is expensive and complicated compared to the present invention.

The slip chucks, well known in the art, comprise one end attachable to the shaft of a tap and an opposite end detachably engageable to drive such as the spindle of a mill. An adjustment sleeve between the ends of the chuck is positioned by the operator to adjust the strength of coupling between the ends of the slip chuck to an optimum value selected to prevent breakage of the tap.

Before the tapping operation, the "coupling" strength is adjusted to the optimum value by:

4. coupling the coupler end of a calibrated torque wrench to one end of the slip chuck; (The other end of the slip chuck is fixed during the calibration operation.)
5. turning the wrench to the required optimum value of torque as indicated by a dial on the torque wrench;
6. positioning the adjustment sleeve to where the chuck "slips" when the torque exceeds the optimum value The slip chuck is now prepared for attaching the tap to one end of the slip chuck and for mounting the other end of the slip chuck in the mill.

The torque wrench of the prior art includes a spring enclosed in a housing. One end of the spring is fixed to the end of the housing. The other end of the spring is secured to a coupler that is rotatably mounted in the end of the housing and engages one end of the slip chuck.

A dial plate is mounted on the housing arranged to indicate the angular displacement (hence torque) between one end of the spring secured to the housing and the opposite end of the spring secured to the coupler. Hence, by engaging the coupler to the slip chuck and then turning the housing on its axis, the magnitude of applied torque is indicated by the displacement (rotation) of the dial plate relative to the coupler. The adjustment sleeve on the slip chuck is positioned to where the slip chuck will release when the applied torque on the wrench approaches the breaking torque of a tap to be used with the slip chuck.

The problem with using the torque metered wrenches presently available to adjust the torque slip value of a slip chuck for preventing breakage of taps 2-56 and smaller is that the torque to be measured with state of the art torque wrenches is within the range of error of reading the required torque.

The range of error is directly related to the repeatability of the dial reading.

When a tap breaks during a CNC operation on parts that requires numerous tapped holes, the numerous untapped holes is not discovered until the tapping operation is complete. Resetting the part in the mill and aligning the already drilled holes with a new tap is a prohibitive operation. Therefore, present practice for tapping holes for 2-56 threads and smaller is to tap the holes by hand. Hand tapping is labor intensive, and also is characterized as being "risky" in terms of the experience and care required by an operator to avoid breakage of the small tap.

SUMMARY OF THE INVENTION

It is an object of this invention to provide a torque wrench for use in a large variety of applications such as meauring the breaking torque of bolts, setting the "release" torque on slip chucks, etc.

It is another object of the invention that the torque wrench be adaptable for measuring a wide range of torques where the accuracy of mesurement is consistent with the range of torque to be measured. This range can include, for example, 0–80 taps and 1–8 taps. In this regard, the method of use for setting the "slip value of torque" of a slip chuck is convenient and reliable in terms of the accuracy and repeatibility required to apply torque to a tap that is size 2-56 and smaller.

Important features of the invention are based on the observation that the origin of the dial scale fails to return to its imitial (zero) position after the torque applied during calibration is removed I have discovered that this failure resides in two sources. One source is memory of flexure (permanent strain) of the spring which is part of the torque wrench and is flexed during the operation. A second source is frictional force between the spring housing and the rotatably mounted coupler on one end of the spring housing when force is exerted to turn the spring housing.. The coupler couples one end of the spring to the end of a shaft such as the shaft of a slip chuck.

This invention is directed toward a torque wrench which includes an elongated housing enclosing an elongated spring. The spring comprises a stack of relatively thin metal strips. One end of the stack of strips is internally secured to one end of the housing. The other end of the strips is secured to a coupler, journalled by bearings to the inside opposite end of the housing. The coupler is attachable to a slip chuck. A dial plate is rotationally mounted on the coupler and may be rotated to where a "catch" (mark) on the housing coincides with the origin on the dial scale when no torque is applied between coupler and housing.

An important feature of the invention is that the force applied to turn the housing and the point of attachment of the end of the stack of springs to the coupler are substatially coplanar with the bearing. This avoids extraneous geheration of torque that is not coincident with the axis of the bearing.

The relative position between dial plate and coupler is maintained by a friction force between the dial plate and coupler. The friction force is exerted by a bellville spring that urges the dial plate against the coupler. Therefore, when there is no torque exerted to rotate the coupler relative to the housing, the origin of the dial scale is positionable to coincide with the "catch" on the housing.

A ring with a cog is mounted free to rotate in a circular slot in the dial plate concentric with the coupler.

When no torque is applied between coupler and housing, the dial plate is rotated to where the origin of the dial scale coincides with the catch on the housing. The ring with cog is rotated to where the cog is against the catch. When torque is applied between housing and coupler, the catch rotates away from the origin of the dial plate and also pushes the cog away from the origin (rotates the ring with cog) to a position adjacent a torque reading on the dial scale. When the torque is removed, the housing rotates to where the catch on the housing returns to coincidence with the origin of the dial scale. The cog on the ring remains in a position relative to the dial scale indicating the applied torque. Therefore the torque reading remains even after the torque has been reduced to zero.

After the torque has been removed so that the catch returns to the origin of the dial scale, then the operator rotates the ring to where the cog on the ring coincides with the catch and origin of the dial scale in preparation for the next reading.

To calibrate a slip chuck so that applied torque between ends of the slip chuck will not exceed an optimum value corresponding to breaking strength of a tap to be attached to the slip chuck, one end of the slip chuck is attached to the coupler and the other end of the slip chuck is fixed. The operator turns the housing so that the optimum value of torque (corresponding to the breaking strength of the tap) is applied to the end of the slip chuck. The adjustment sleeve on the chuck is adjusted to where the slip chuck barely slips. The slip chuck is then detached from the torque wrench and mounted in the drive (mill, or hand wrench) for tapping holes.

An important novel feature of the invention is that the spring comprises a stack of thin metal strips that exhibits no permanent distortion (flexure) when returned to starting position from a twisted position assumed during a calibration operation.

Another important feature is that the bearing support between the coupler and inside housing eliminates drag that would otherwise prevent complete return of the housing to its initial position.

The result of these features is that the catch on the housing will return to its initial position coincident with the origin of the dial scale when torque is removed.

Another important feature is the friction between the dial plate and coupler which is adjustable by virtue of the bellville spring. The friction is adjusted to where the rotational position of the dial plate is stabilized but is not so great as to prevent rotation of the dial plate relative to the coupler when required.

DESCRIPTION OF A BEST MODE

Figure 3:
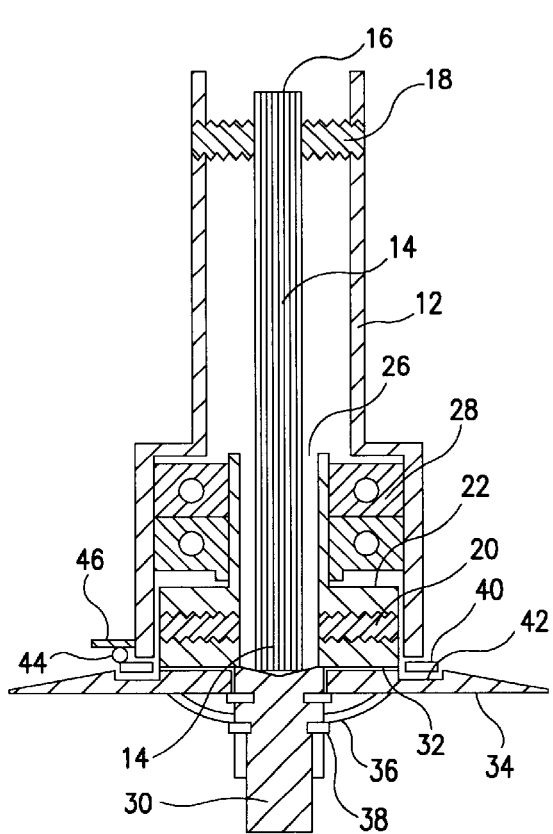
FIG. 3 is a sectional view of FIG. 1.
Figure 2:
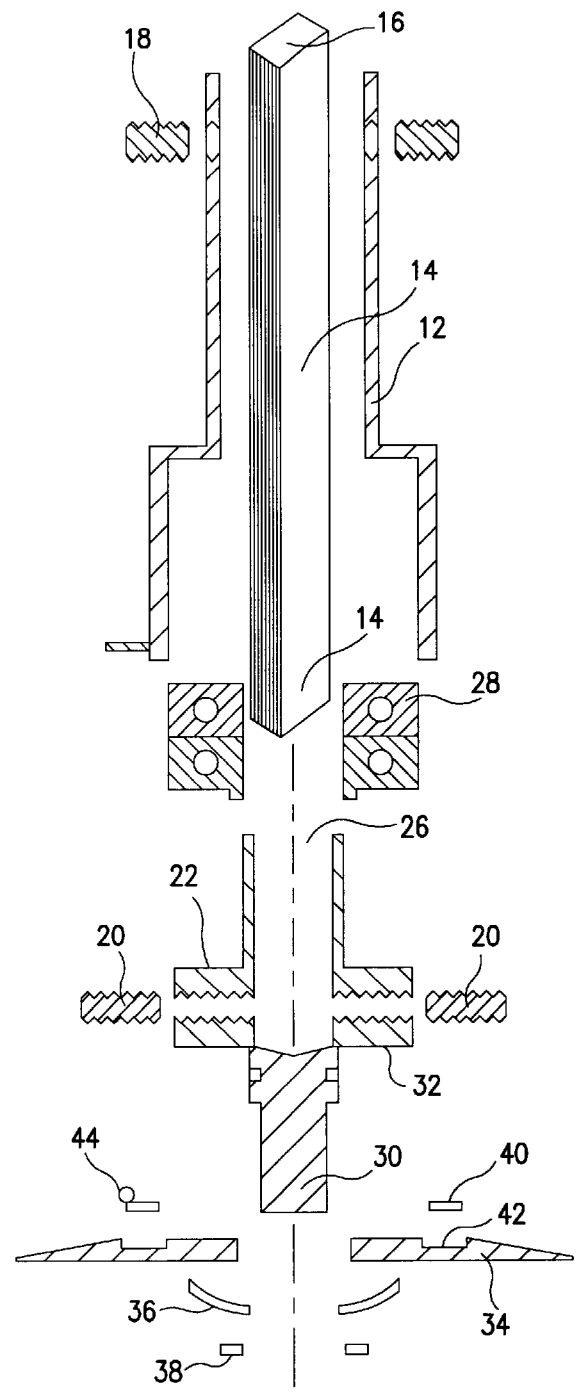
FIG. 2 is a sectional exploded view of FIG. 1.
Figure 1:
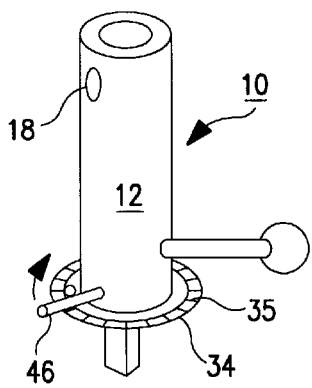
FIG. 1 shows a perspective assembly view of the torque wrench.

Turning now to a discussion of the drawings, FIG. 1 is a perspective assembly view of the torque wrench 10 of this invention. FIG. 2 is an exploded sectional view of FIG. 1. FIG. 3 is a sectional view of FIG. 1. There is shown an elongated housing 12 enclosing an elongated spring. The spring is a stack of thin metal strips 14. One end 16 of the strips is secured by set screws 18 inside one end of the housing 12. The other end of the strips 14 is secured by set screws 20 to a coupler 22. The coupler 22 is a stepped cylinder with a bore in one end 26 for admitting and attaching the stack of springs inside the coupler. The one end 26 of the coupler 22 is journalled inside the housing by bearings 28. The other (free) end 30 of the coupler is configured for attachment of a suitable drive such as the end of a slip chuck (Slip chuck is not shown.) A dial plate 34, having a dial scale 35, is rotatably mounted on the shoulder 32 of the coupler and retained by a bellville spring 36 and snap ring 38. The snap ring 38 snaps into a groove in the side of the coupler 12. A flat ring 40 nests in a groove 42 in the dial plate 34 and is dimensioned to slideably rotate freely in the groove 42. The flat ring 40 has a cog 44 on its flat surface. When the housing 12 is rotated (torque is applied) a "catch" 46 on the side of the housing 12 pushes the cog to a torque reading on the dial scale 35.

Figure 4:
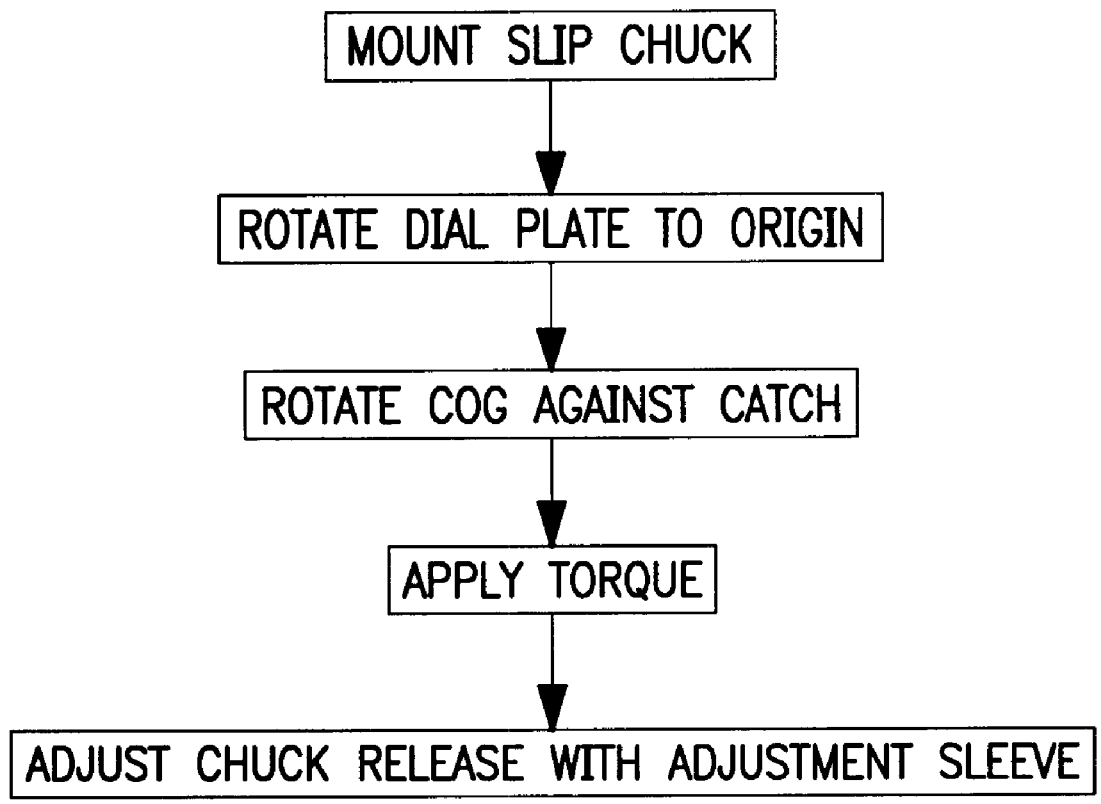
FIG. 4 is a flow chart listing steps for adjusting a slip chuck to an optimum value of release torque.

FIG. 4 is a flow diagram of the method for using the torque adjustment wrench of this investment to adjust the gripping force of a slip chuck.

In step 1, a slip chuck is mounted by engaging one end with a stationary shaft and an opposite end engaging the torque adjustment wrench of this invention.

In step 2, In step 2 the dial plate of the torque adjustment wrench is rotated to where the origin (zero) of the dial scale coincides with a catch (mark) on the housing.

In step 3, the sliding ring is rotated to where the cog oF the sliding ring is against the catch.

In step 4, the operator turns the spring housing by grasping the handle attached to the spring housing thereby applying torque to the slip chuck. The catch on the housing pushes the cog to a reading on the dial scale corresponding to the optimum torque applied to the slip chuck.

In step 5, the adjustment sleeve on the slip chuck is turned to where the slip chuck just barely releases (the coupling between the ends of the slip chuck is overcome).

The slip chuck is now ready for use in an operation to tap holes using a tap corresponding to the selected optimum torque.

There has been described a torque wrench and its method of use for applying and measuring very small torques. Accuracy in its use resides in an ability to remove the effects of extraneous strains that are present in state-of-the-art torque wrenches. This problem has been overcome by use of a spring being a stack of metal thin strips and bearing support of the coupler.

The thicknesses of the metal strips are selected according to the range of torque to be measured. For example, five strips of 0.003" thickness (spring steel) is used as the spring to measure torque for 0-80 taps. A stack of four strips having thicknesses of 0.010" is used to measure larger torque values.

Variations and modifications may be contemplated after reading the specification and studying the drawings that are within the scope of the invention. For example, the "drive" member on the free end of the coupler is selectable according to the application of the wrench.

I therefore wish to define the scope of my invention by the appended claims.

I claim:

1. A metered torque wrench which comprises:

an elongated housing;

a stack of resislient metal strips enclosed in said housing:

said stack having a long dimension extending in a direction of a long dimension of said housing;

means for securing one end of said stack in one end of said housing;

a coupler positioned in another end of said housing and adapted to rotate about an axis parallel to a long dimension of said housing;

said coupler having means for securing one end of said coupler to another end of said stack;

said coupler having another end extending from said another end of said housing accessible for mounting a drive on said another end of said coupler;

a dial plate having a circular dial scale whose outside diameter is larger than a diameter of said housing;

means for mounting said dial plate on said coupler having said dial scale concentric with an axis of said housing and adjacent to a rim bounding said another end of said housing;

a marker on a surface of said housing arranged to indicate a rotational position of said housing relative to an orign of said dial scale providing that, when said another end of said coupler is engaged with a drive and said housing is rotated, said marker is displaced from said origin by a displacement value corresponding to a value of torque applied to said housing relative to said coupler.

2. The metered torque wrench of claim 1 further comprising at least one bearing having an inner race supporting said one end of said coupler and an outer race supported by an interior surface of said housing adjacent said another end of said housing.

3. The metered torque wrench of claim 1 wherein said means for mounting said dial plate on said coupler comprises:

said coupler having a shoulder on said another end;

said dial plate having a central aperture dimensioned to permit said shoulder to support said dial plate on one side of said dial plate;

a bellville spring having a central aperture;

said coupler protruding through said apaeerture of said bellvieq spring said bellville spring arranged to force said dial plate against said shoulder of said coupler thereby stabilizing said dial plate relative to said coupler.

4. The metered torque wrench of claim 1 further comprising:

said dial plate having a circular groove located on said one side of said dial plate concentric with said dial plate;

a flat ring positioned in said circular groove;

a cog mounted on a flat surface of said flat ring and extending away from said dial plate;

said ring and said cog arranged to permit said cog to engage said marker when said housing is rotated in a direction whereby a rotational displacement of said cog by contact with said marker and relative to said origin of said dial scale indicates magnitude of torque applied to said spring.

5. The metered torque wrench of claim 1 wherein each one of said metal strips of said stack of metal strips has a thickness selected from a range of thicknesses from 0.002 inch to 0.020 inches.

6. The metered torque wrench of claim 1 wherein said drive is arranged for engaging at least one of a socket wrench, a screw driver blade, a shank of a tap.

7. The metered torque wrench of claim 1 further comprising a handle attached to said housing.

8. The metered torque wrench of claim 1 wherein said means for securing one end of said stack in one end of said housing comprises;

a pair of set screws screwed into a wall of said housing adjacent said one end of said housing;

said one end of said stack positioned inside said housing and clamped between said setscrews.

9. The metered torque wrench of claim 1 wherein said means for securing said another end of said stack to said one end of said coupler comprises:

said coupler having a bore extending from said one end of said bore;

a pair of set screws screwed into said coupler and extending into said bore;

said another end of said stack clamped between said set screws.

10. A metered torque wrench which comprises:

an elongated housing;

a stack of resislient metal strips enclosed in said housing:

said stack having a long dimension extending in a direction of a long dimension of said housing;

a pair of set screws screwed into a wall of said housing adjacent said one end of said housing;

said one end of said stack positioned inside said housing and clamped between said setscrews;

a coupler positioned in another end of said housing and adapted to rotate about an axis parallel to a long dimension of said housing;

said coupler having a bore extending from said one end of said bore; a pair of set screws screwed into said coupler and extending into said bore;

said another end of said stack clamped between said set screws;

said coupler having another end extending from said another end of said housing accessible for mounting a drive on said another end of said coupler;

a dial plate having a circular dial scale whose outside diameter is larger than a diameter of said housing;

said coupler having a shoulder on said another end;

said dial plate having a central aperture dimensioned to permit said shoulder to support said dial plate on one side of said dial plate;

a bellville spring having a central aperture;

said coupler protruding through said aperture of said bellville spring;

said bellville spring arranged to force said dial plate against said shoulder of said coupler, thereby stabilizing said dial plate relative to said coupler;

a marker on a surface of said housing arranged to indicate a rotational position of said housing relative to an orign of said dial scale providing that, when said another end of said coupler is engaged with a drive and said housing is rotated, said marker is displaced from said origin by a displacement value corresponding to a value of torque applied to said housing relative to said coupler;

at least one bearing having an inner race supporting said one end of said coupler and an outer race supported by an interior surface of said housing adjacent said another end of said housing;

said dial plate having a circular groove located on said one side of said dial plate concentric with said dial plate;

a flat ring positioned in said circular groove;

a cog mounted on a flat surface of said flat ring and extending away from said dial plate;

said ring and said cog arranged to permit said cog to engage said marker when said housing is rotated in a direction whereby a rotational displacement of said cog by contact with said marker and relative to said origin of said dial scale indicates magnitude of torque applied to said spring;

each one of said metal strips of said stack of metal strips has a thickness selected from a range of thicknesses from 0.002 inch to 0.020 inches;

said drive is arranged for engaging any one of a socket wrench, a screw driver blade, a shank of a tap;

a handle attached to said housing.

11. A method for applying a measured torque to a shaft wherein said shaft is fixed on one end, said method including the steps:

a.) selecting a stack of metal strips wherein a quantity of said strips and thickness of said strips is selected according to an anticipated range of torque to be measured;

b.) providng a metered torque wrench comprising:
an elongated housing;
said selected stack of resilient metal strips enclosed in said housing;
said stack having a long dimension extending in a direction of a long dimension of said housing;
a pair of set screws screwed into a wall of said housing adjacent said one end of said housing;
said one end of said stack positioned inside said housing and clamped between said setscrews;
a coupler positioned in another end of said housing and adapted to rotate about an axis parallel to a long dimension of said housing;
said coupler having a bore extending from said one end of said bore;
a pair of set screws screwed into said coupler and extending into said bore;
said another end of said stack clamped between said set screws;
said coupler having another end extending from said another end of said housing accessible for mounting a drive on said another end of said coupler;
a dial plate having a circular dial scale whose outside diameter is larger than a diameter of said housing;
said coupler having a shoulder on said another end;,
said dial plate having a central aperture dimensioned to permit said shoulder to support said dial plate on one side of said dial plate;
a bellville spring having a central aperture;
said coupler protruding through said aperture of said bellville spring;
said bellville spring arranged to force said dial plate against said shoulder of said coupler, thereby stabilizing said dial plate relative to said coupler;
a marker on a surface of said housing arranged to indicate a rotational position of said housing relative to an orign of said dial scale providing that, when said another end of said coupler is engaged with a drive and said housing is rotated, said marker is displaced from said origin by a displacement value corresponding to a value of torque applied to said housing relative to said coupler;
at least one bearing having an inner race supporting said one end of said coupler and an outer race supported by an interior surface of said housing adjacent said another end of said housing;
said dial plate having a circular groove located on said one side of said dial plate concentric with said dial plate;
a flat ring positioned in said circular groove;
a cog mounted on a flat surface of said flat ring and extending away from said dial plate;
said ring and said cog arranged to permit said cog to engage said marker when said housing is rotated in a direction whereby a rotational displacement of said cog by contact with said marker and relative to said origin of said dial scale indicates magnitude of torque applied to said spring;
each one of said metal strips of said stack of metal strips has a thickness selected from a range of thicknesses from 0.002 inch to 0.020 inches;
said drive is arranged for engaging at least one of a socket wrench, a screw driver blade, a shank of a tap;
a handle attached to said housing;

c.) engaging another end of said shaft opposite said fixed end;

d.) applying said measured torque to said shaft guided by reading said applied torque on said dial scale.

* * * * *